United States Patent [19]

Kenneth et al.

[11] Patent Number: 5,594,233
[45] Date of Patent: Jan. 14, 1997

[54] MULTIPLE STANDARD SMART CARD READER

[75] Inventors: Alexander R. Kenneth, Dundee, Scotland; Munther S. Mahsoub, Yokohama, Japan

[73] Assignee: AT&T Global Information Solutions Company, Dayton, Ohio

[21] Appl. No.: 427,373

[22] Filed: Apr. 24, 1995

[30] Foreign Application Priority Data

Nov. 11, 1994 [GB] United Kingdom ................ 94228038

[51] Int. Cl.$^6$ .................................................. G06K 19/06
[52] U.S. Cl. ........................................ 235/492; 235/487
[58] Field of Search .................................. 235/487, 492

[56] References Cited

U.S. PATENT DOCUMENTS

| | | | |
|---|---|---|---|
| 5,010,239 | 4/1991 | Mita | 235/492 |
| 5,296,892 | 3/1994 | Shino | 235/492 |
| 5,331,138 | 7/1994 | Saroya | 235/492 |
| 5,332,890 | 7/1994 | Kitahara | 235/492 |
| 5,420,412 | 5/1995 | Kowalski | 235/492 |
| 5,451,763 | 9/1995 | Pickett et al. | 235/492 |

*Primary Examiner*—Harold Pitts
*Attorney, Agent, or Firm*—James M. Stover

[57] ABSTRACT

A card reader (16) having a single entry slot (18) for cards (2), and an electronic control means (35) for controlling the operation of the reader (16). The reader (16) further includes a smart card reading section (26) incorporating a plurality of terminals (34,38,36) respectively adapted to read contact smart cards, inductive contactless smart cards and capacitive contactless smart cards. A pair of endless belts (28) are arranged to form a feed path (30) there between. A card (2) inserted through the entry slot (18) is received between the endless belts (18) and transported through the card reader (16) and positioned in the smart card reading section (26) so that smart card terminals (6,8 or 10) on the card (2) are located beneath corresponding smart card terminals (34,36 or 38) in the card reader (16). Data can then be read from the card (2) if the card (2) is a contact smart card, an inductive contactless smart card or a capacitive contactless smart card.

15 Claims, 3 Drawing Sheets

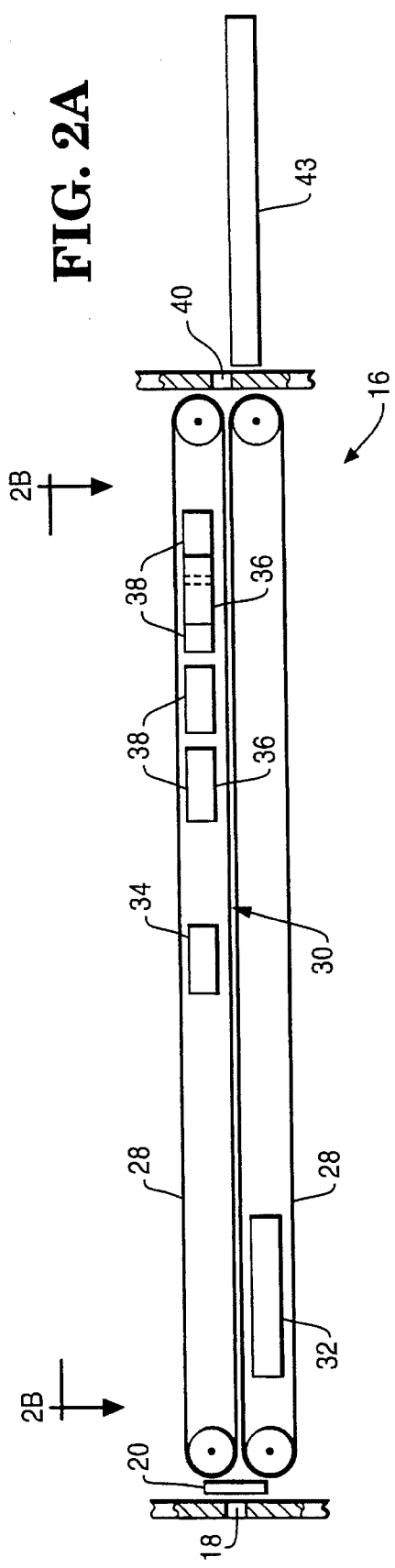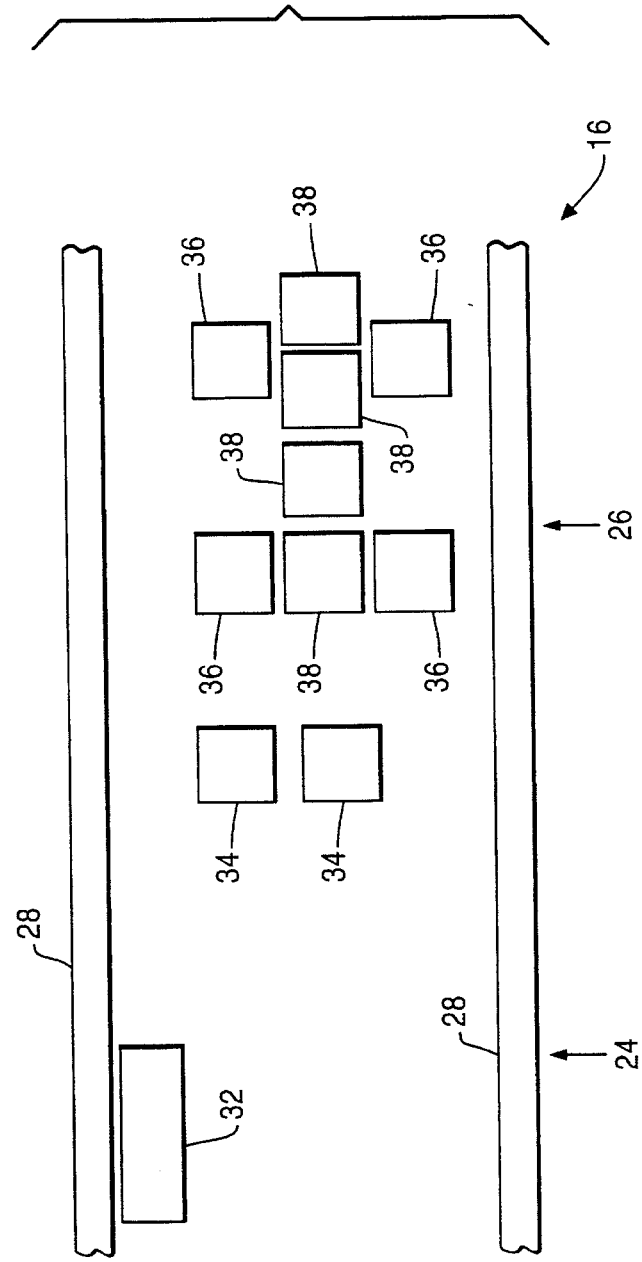

MULTIPLE STANDARD SMART CARD
READER

This invention relates to card readers and to card reader writers and a method of operation thereof. The invention has application, for example, to a card reader for use in a transaction terminal such as an automated teller machine (ATM).

BACKGROUND OF THE INVENTION

There are two main types of cards available at present, magnetic stripe cards and IC cards in which is embedded an integrated circuit chip which can be configured to provide a variety of functions. IC cards are commonly referred to as smart cards and this is the term which will be used herewith in the specification and claims.

These cards can be used, in association with an appropriate read/writer, in a vast array of different environments. For example, user identification cards are used in association with a personal identification number (PIN) to provide access to an ATM. Also financial service cards such as credit or debit cards are used to contain information on a user's bank or building society accounts so that transactions can be attributed to those accounts merely by reading the card.

Most cards are substantially rectangular being approximately 85 mm long by 54 mm wide. Magnetic stripe cards incorporate a magnetic stripe which runs the length of the card adjacent one side. Data is stored in the magnetic stripe by causing variations in the magnetism of the material which forms the stripe, normally a powdered metal oxide such as iron oxide or chromium oxide.

The magnetic stripe is read by moving it past a reading head which detects the magnetism of the stripe and converts the magnetic signal stored therein into an electric data signal. However, magnetic stripe cards are of limited use as only a small amount of data can be stored on them. For example, a bank customer's account details and some additional information, such as an encrypted PIN number, can be stored on a magnetic stripe card, but if additional information is required to be stored then a smart card with an embedded microprocessor will be required.

Smart cards are of similar dimensions to magnetic stripe cards. However, because they contain an integrated circuit chip they can store considerably more data than a magnetic stripe card, and can be adapted to provide a number of functions in addition to merely storing data.

Smart cards are sub-divided into two groups: a) contact smart cards, in use of which retractable metallic terminals within a reader/writer are moved to physically engage a terminal or contact area on the card, in order to transmit data to and receive data from the card; and 2) contactless smart cards, in use of which data is transmitted to and received from the smart card without physically contacting the card. Contactless smart cards are read by capacitive or inductive terminals. Each of the contact or contactless smart card terminals incorporate up to eight terminal points including a power terminal point, a reset terminal point, a data transmission terminal point and a data receipt terminal point. A voltage is applied to the power terminal point by a reader/writer so as to activate the integrated circuit chip within the smart card. The reset terminal point is utilised by a reader/writer in determining which type of card is present in the read/writer and which communication protocol is utilised by the card, as will be described further in connection with a specific embodiment of the present invention. The transmission terminal point and receipt terminal point respectively are used by the card to transmit data to and receive data from the reader/writer, when in use.

The contactless smart card capacitive terminals on the card and the corresponding contactless smart card capacitive terminals in the reader/writer each perform as a plate of a capacitor. Therefore, once the chip in the smart card has been activated it may transmit data to the card reader/writer by virtue of the capacitive coupling between the smart card and the reader/writer. The inductive terminals of the card and reader/writer operate in an analogous fashion in which each terminal operates as a coupled induction coil so that data may be transmitted by virtue of the inductive coupling between the smart card and the reader/writer.

There are a variety of different magnetic stripe, contact smart card and contactless smart card formats. The most important of these formats are the ISO standard formats which are ISO 7810-13 for magnetic stripe cards, ISO 7816 for contact smart cards and ISO 10536 for contactless smart cards. These standards determine the locations of magnetic stripes and terminals on the cards and the communication protocols utilised by each type of card.

In view of the various cards available for obtaining access to transaction terminals or other facilities, many known card readers have been severely restricted in respect of the types of cards that can be read by the readers. In order to enhance the versatility of access control equipment, manufacturers have provided separate card readers with separate entry slots for magnetic stripe and smart cards. Such an arrangement has the disadvantage that a relatively large amount of space is required for the card readers. There are also card readers available that read magnetic stripe cards and contact smart cards and utilize a single entry slot. However, these readers are also relatively large and support only a single smart card type and do not support the range of available smart card types which comply with the smart card ISO standards.

OBJECTS OF THE INVENTION

It is an object of the present invention to provide a card reader of compact construction and having a high versatility as regards the different types of cards that can be read by the reader.

SUMMARY OF THE INVENTION

According to a first aspect of the present invention there is provided a card reader having an entry slot for cards, and electronic control means for controlling the operation of said reader, characterized by a smart card reading section incorporating a plurality of smart card reading means respectively adapted to read contact smart cards, capacitive contactless smart cards and inductive contactless smart cards; and transport means for moving a card inserted through said entry slot through said reader and for positioning said card in said smart card reading section, said control means being arranged to activate said plurality of smart card reading means in sequence while said card is positioned in said smart card reading section, said control means being arranged to determine which type of ISO standard card has been inserted into said reader and to implement the appropriate communications protocol to read data from said card, whereby data can be read from said card if said card is a contact smart card, a capacitive contactless smart card or an inductive contactless smart card conforming to predetermined ISO standards.

According to a second aspect of the invention there is provided a method of operating a card reader, characterized by the steps of: a) receiving a card; (b) conveying said card past a magnetic stripe read head so as to read any data stored on a magnetic stripe on said card; (c) bringing said card to rest adjacent a plurality of smart card reading means respectively adapted to read contact smart cards, capacitive contactless smart cards, and inductive contactless smart cards; and sequentially activating said plurality of smart card reading means while said card is at rest, a determination being made while each of said reading means is activated as to whether said card is a smart card corresponding to the activated reading means, and, if it is, a reading of data from said card taking place.

The above and other objects, features, and advantages of the present invention will become apparent from the following description and the attached drawings.

BRIEF DESCRIPTION OF THE DRAWINGS

FIG. 2A is a schematic side view of a card reader/writer in accordance with the present invention;

FIG. 2B is a schematic plan view of the card reader/writer of FIG. 2A, part of the reader/writer being broken away.

DETAILED DESCRIPTION OF THE PREFERRED EMBODIMENT

Figure 1A:
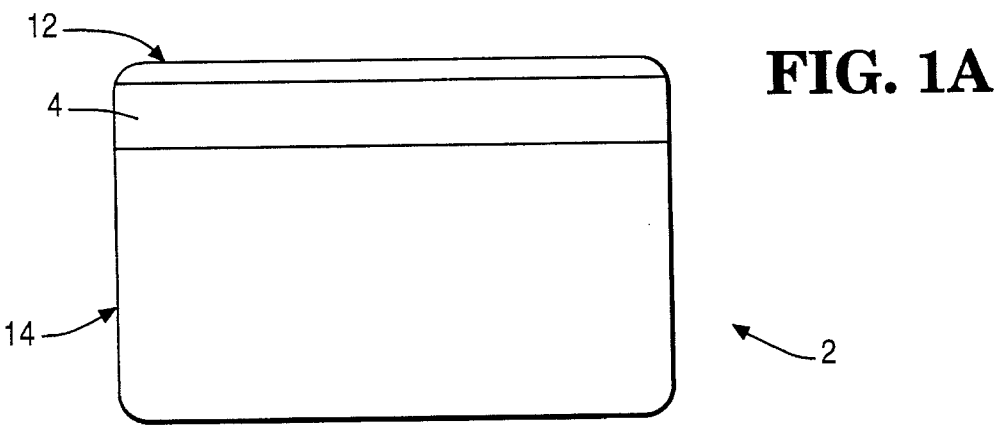
FIGS. 1A to 1D show plan views of four cards each of which complies with one of the aforementioned ISO standards, FIG. 1A showing a magnetic stripe card, FIG. 1B showing a contact smart card, FIG. 1C showing a contactless inductive smart card and FIG. 1D showing a contactless capacitive smart card.

With reference to FIG. 1A, there is illustrated a magnetic stripe card 2 having a magnetic stripe 4 running the length of the card adjacent the reference edge 12, in accordance with ISO 7810-13.

Figure 1B:
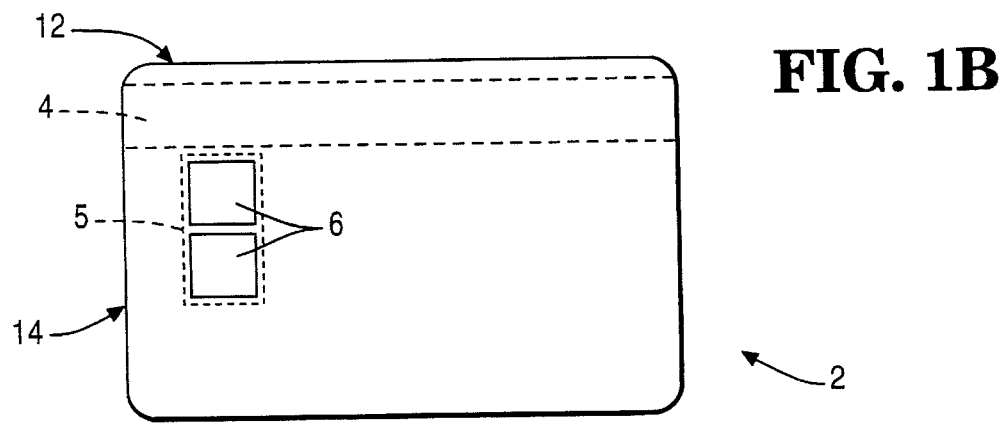

FIG. 1B illustrates a contact smart card 2 having two contact terminals 6 positioned on one side of the card, in accordance with ISO 7816. The smart card also includes a microprocessor chip 5 embedded in the card beneath the terminals 6, and a magnetic stripe 4 positioned as in the magnetic stripe card of FIG. 1A. The magnetic stripe 4 is positioned on the opposite side of the card 2 from the smart card terminals 6 in accordance with ISO standards.

Figure 1C:
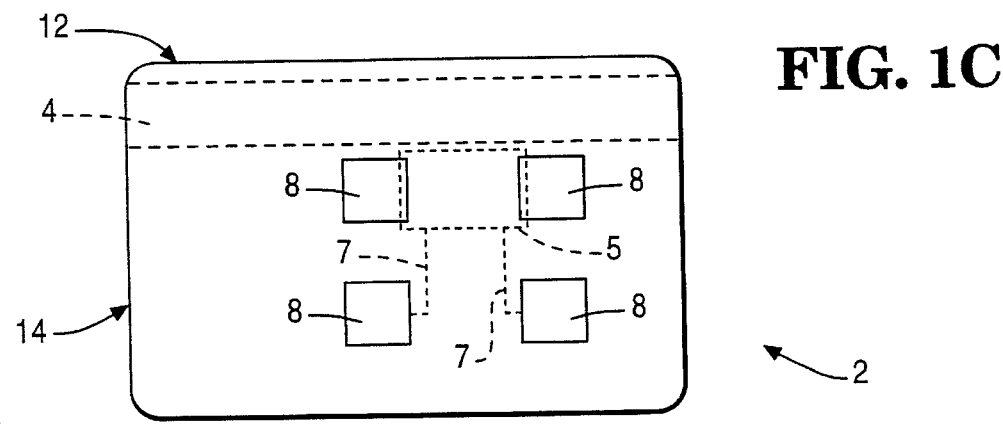

FIG. 1C illustrates a contactless inductive smart card 2 having two pairs of contactless inductive terminals 8 positioned in accordance with ISO 10536 and an embedded microprocessor chip 5 beneath one of the pairs of terminals 8. The terminals 8 are each connected to the chip 5 by a lead 7. The contactless inductive smart card 2 also includes a magnetic stripe 4 positioned as in the magnetic stripe card 2 of FIG. 1A.

Figure 1D:
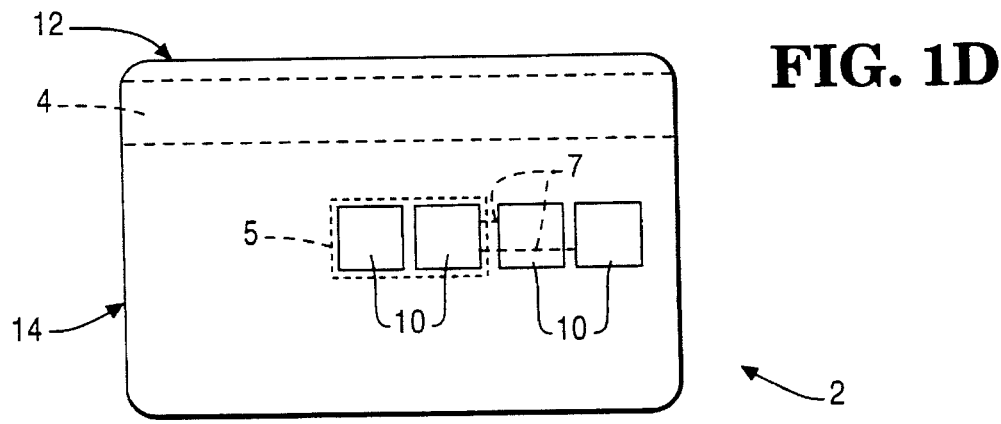

FIG. 1D illustrates a contactless capacitive smart card 2 having four contactless capacitive terminals 10 positioned in accordance with ISO 10536 and an embedded microprocessor chip 5 beneath one pair of terminals 10. The terminals 10 are each connected to the chip 5 by a lead 7. The contactless capacitive card 2 also includes a magnetic stripe 4 positioned as in the magnetic stripe card 2 of FIG. 1A.

The magnetic stripe 4 in each of the smart cards need not contain any data and is only required to gain access to the card reader/writer 16, as will be described below.

Figure 3:
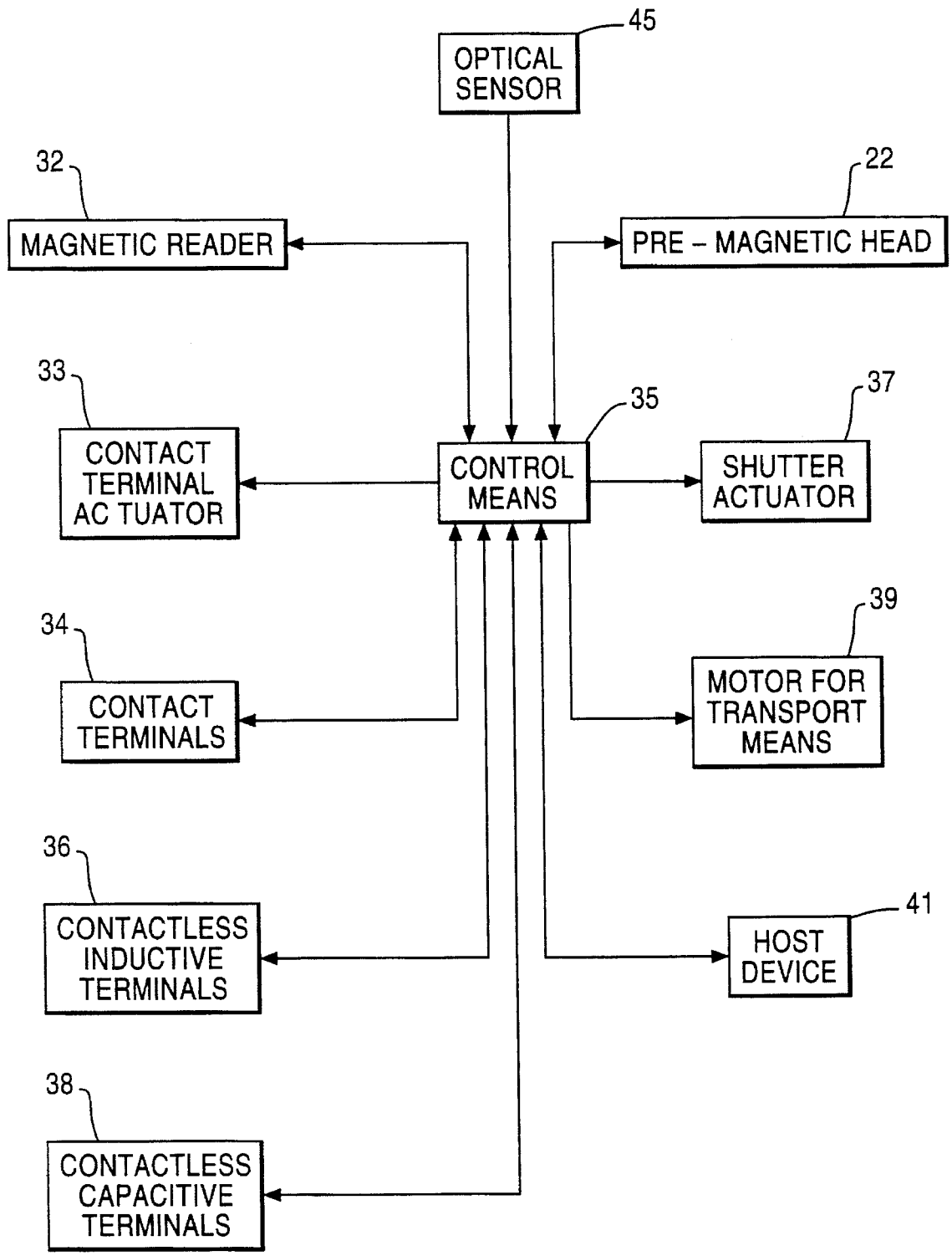
FIG. 3 is a block circuit diagram of the card reader/writer.

With reference to FIG. 2A and 2B there is illustrated a card reader/writer 16 in accordance with the present invention. The reader/writer 16 includes an input slot 18 dimensioned so as to receive a card 2. The slot 18 is closed when not in use by a retractable shutter 20, which is movable so as to enable the entry of a card 2 into the reader/writer 16. Referring additionally to FIG. 3, the position of the shutter 20 is controlled by a shutter actuator 37 operated under the control of a control means 35 the shutter 20 being moved so as to enable entry of a card 2, when a card 2 incorporating a magnetic stripe 4 is detected by a pre-magnetic head 22 located adjacent the slot 18. If the pre-magnetic head 22 fails to detect a magnetic stripe 4 then the shutter 20 will not be retracted and the card 2 will not be received by the reader/writer 16.

The reader/writer 16 has two main sections, a magnetic head section 24 adjacent the input slot 18 and a smart card section 26 located on the side of the magnetic head section 24 remote from the input slot 18. The reader/writer 16 incorporates a card feed means in the form of a pair of cooperating endless belts 28 which receive a card 2 at the slot 18 and convey the card 2 along a feed path 30 through both sections 24,26 of the reader/writer 16 with portions of the card 2 adjacent its long edges being gripped between the belts 28.

The reader/writer 16 includes a magnetic stripe read head 32 located in the magnetic head section 24 of the reader/writer 16 so as to be in line with the magnetic stripe 4 on a card 2 as the card 2 is transmitted along the feed path 30 by the endless belts 28.

The reader/writer 16 further includes a pair of contact smart card terminals 34, two pairs of contactless smart card inductive terminals 36 and four contactless smart card capacitive terminals 38 located in the smart card section 26 of the reader/writer 16 and arranged so that the corresponding terminals 6,8 or 10 (FIG. 1B, 1C and 1D) on a smart card 2 are positioned in cooperative relationship with the terminals 34,36 or 38, when the card 2 is located at a predetermined position in the smart card section 26 of the reader/writer 16 by the endless belts 28. As seen in FIG. 2B, the capacitive terminals 38 are formed in a line extending parallel to the feed path 30, with a first pair of the inductive terminals 36 being disposed on one side of the line of capacitive terminals 38, and with the other pair of inductive terminals 36 being disposed on the opposite side of the line of capacitive terminals 38.

The endless belts 28 extend to a second slot 40 in the reader/writer 16 at the opposite end of the feed path 30 from the input slot 18. The second slot 40 provides access to a retention bin 43 in which cards 2 retained by the reader/writer 16 are received. Cards can be retained if they prove to have been stolen or to be faulty, or if the user fails to enter the correct PIN number after a predetermined number of attempts or if the card is not removed by the user within a predetermined time after the ATM transaction has been completed, as described below.

The aforementioned control means 35 (FIG. 3) has stored therein the various communication protocols which are defined by the appropriate ISO standard and are utilized by magnetic stripe cards, contact smart cards and inductive and capacitive contactless smart cards. Also, this intelligent control means 35 has stored therein the necessary software to enable it to recognise different types of cards, i.e. magnetic stripe cards, contact and contactless smart cards and different formats of card within these card types, and to enable the reader/writer 16 to read data from and write data into any of the available card types and formats.

The control means 35 controls the operation of the card reader/writer 16 so that when a card 2 enters the reader/writer 16 a check is first made as to whether or not the card 2 is a contact smart card. The card 2 is transported to the smart card section 26 and the contact terminals 34 are pivoted into engagement with the contact terminals 6 on the card 2 by an actuator 33 (FIG. 3), in the form of a solenoid, and activated. It should be understood that as the card 2 is transported to the smart card section 26 any data stored in the magnetic stripe 4 of the card 2 is read by the magnetic stripe read head 32 and stored in the control means 35. After being stopped in the aforementioned predetermined position in the smart card section 26, a reset signal is transmitted to the card 2 and if the card 2 is a contact smart card an appropriate response is sent by the chip 5 to the control means 35, wherein communication with the card 2 is established. First of all the format of the card 2 is determined, e.g. whether the card 2 conforms to ISO 7816 and then the appropriate communication protocol is called up to enable the reader/writer 16 to read data from and possibly write data into the card 2. If the card 2 proves not to be a contact smart card then the contact terminals 34 are de-activated and disconnected from the card 2, and the contactless terminals 36 or 38 are activated. Either the inductive or capacitive terminals 36 or 38 may be activated first. In this embodiment the capacitive terminals 38 are activated prior to activating the inductive terminals 36. Again a reset signal is transmitted to the card 2, this time to determine if the card 2 is a capacitive contactless smart card. If it is, the format of the card 2 is determined, and the appropriate communication protocol is called up to enable the reader/writer 16 to read data from and possibly write data into the card 2. If the control means 35 determines that the card 2 is not a capacitive contactless smart card then a reset signal is applied to the card 2 by the inductive terminals 36, this time to determine if the card 2 is an inductive contactless smart card. If it is, again the format of the card 2 is determined and the appropriate communication protocol is called up to enable the reader/writer 16 to read data from and possibly write data into the card 2.

If none of the smart card terminals 6,8 or 10 respond to the card 2 then the card 2 is determined not to be a smart card and the data read from the magnetic stripe 4 and stored in the control means 35 as the card 2 was being transported to the smart card section 26 is transmitted to the host device 41 (FIG. 3) from the control means 35.

Data read from a card 2 in the case of the card being a smart card 2 is also transmitted to the host device 41. In addition, the host device 41 transmits to the control means 35 any data that is to be written into the card 2. The host device 41 may be an ATM and, depending on the data read from a card 2 and possibly other data entered in the device 41, the device 41 instructs the reader/writer 16 to return the card 2 to a user or retain the card 2.

Referring again to FIG. 3, the reader/writer 16 incorporates a pre-magnetic head 22 located adjacent the slot 18 which sends a signal to the control means 35 when a card 2 incorporating a magnetic stripe 4 is brought into the proximity of the pre-magnetic head 22. The control means 35 then instructs the shutter actuator 37 to open the shutter 20 to receive the card 2, and activates a motor 39 to drive the endless belts 28 (FIG. 2) thus transporting the received card 2 through the card reader/writer 16, as will be described below.

The operation of the card reader/writer 16 will now be described in more detail.

The process starts by inserting the leading edge of a card into the slot 18 of the reader/writer 16. If the pre-magnetic head 22 adjacent the slot 18 in the reader/writer 16 detects a magnetic stripe 4 on the card 2 it will send a signal to the control means 35 which results in the reader/writer 16 opening the shutter 20 providing access to the interior of the reader/writer 16. If the pre-magnetic head 22 fails to detect a magnetic stripe 4 on the card 2 then the control means 35 will not instruct the shutter actuator 37 to open, thereby preventing entry of the card 2 into the reader/writer 16.

Assuming the card 2 has a magnetic stripe 4 and accordingly the shutter 18 has been opened by the reader/writer 16, the next step is the receipt of the card 2 by the endless belts 28. The endless belts 28 transport the card 2 through the magnetic head section 24 of the reader/writer 16 and past the magnetic stripe read head 32. Data written on the magnetic stripe 4 will at this time be read by the magnetic stripe read head 32 and stored in the electronic control means 35 for future use if the card 2 proves not to be a smart card.

Once the card 2 is received by the endless belts 28 and has cleared the shutter 20 the control means 35 will cause the shutter actuator 37 to move the shutter 20 to close the slot 18. The card 2 is then transported past the magnetic stripe read head 32 and into the smart card section 26 of the reader/writer 16 where it is brought to rest.

If the card 2 is a smart card, then when it is brought to rest the card 2 is located such that its smart card terminals 6,8 or 10 are positioned beneath, and in cooperative relationship with respect to, the corresponding smart card terminals 34,36 or 38. The control means 35 causes the card 2 to be positioned in the correct location in the smart card section 26 by de-energising the motor 39 at the appropriate time in response to a signal from an optical sensor 56 (FIG. 3) in the smart card section 26, this sensor 56 sensing the leading edge of the card 2.

The contact smart card terminals 34 are now pivoted into engagement with the card 2 and activated. If the card 2 is a contact smart card, then a DC voltage is applied to the power terminal point of the contact terminals 6 and a reset signal is applied to the reset terminal point of the contact terminal 6. The reader/writer 16 then attempts to detect a response from the card 2 which would signify that the card 2 is in fact a contact smart card. If a response is received then data is read from and possibly written into the card 2 in the manner previously described, data being transmitted between the control means 35 and the host device 41.

If no response is received by the reader/writer 16 then the contact smart card terminals 34 are de-activated and disengaged from the card 2 and the contactless capacitive terminals 38 are activated so as to transmit a power signal and a reset signal to the card 2; in this case, assuming the card 2 is a capacitive contactless card, power is transmitted to the card 2 by transmitting an AC signal to the power terminal point of the terminals 10 of the card 2. As with the activation of the contact card terminals 34 described above if a signal is received from the card 2, signifying that the card 2 is a capacitive contactless smart card, then data is read from and possibly written into the card 2 as previously described.

If no response is received from the card 2, terminals 38 are de-activated and the inductive contactless terminals 36 are activated so as to transmit a power signal and a reset signal to the card 2. Again, if the reader/writer 16 now receives a response from the card 2, indicating that the card 2 is an inductive contactless smart card, then, as in the case of the other types of smart card, data is read from and possibly written into the card 2.

If the card 2 still fails to respond to the reader/writer 16, then the terminals 36 will be de-activated and a check will be made by the reader/writer 16 as to whether any data was read from the magnetic stripe 4 of the card 2 and stored in the control means 35 while the card 2 was being transported to the smart card section 26, indicating that the card 2 is a magnetic stripe card. If the reader/writer 16 does determine that the card 2 is a magnetic stripe card then, as in the case of a smart card, the data read from the card 2 is transmitted to the host device 41, and possibly data may be written into the card 2 as may be decided by the host device 41. If at this stage the reader/writer 16 fails to find that any data has been read from the magnetic stripe 4 then this means that the reader/writer 16 has failed to recognise the card 2, which will normally mean that the card 2 does not belong to one of the types of card for which identifying information is stored in the control means 35. Accordingly, in this case the control means 35 will cause the motor 39 to be energised in the reverse sense so as to return the card 2 to the user.

In general, after the reader/writer 16 has recognised the card 2 as being a particular type of smart card or as being a magnetic stripe card, and a transfer of data between the card 2 and the host device 41 has taken place, the host device 41 will instruct the reader/writer 16 either to return the card 2 to the user or to retain the card 2.

If the command from the host device 41 is to return the card 2 to the user then as mentioned above, the control means 35 energises the motor 39 in the reverse sense, so as to drive the card 2 by means of the belts 28 towards the slot 18 which at this stage will be open. The control means 35 stops the motor 39 with the card 2 projecting partially out of the reader/writer 16 through the slot 18 so that the card 2 can be collected by the user. If the card 2 is taken by the user within a predetermined period of time, the slot 18 is closed by the shutter 20 and the reader/writer 16 is now ready for a further operation. If the user fails to remove the card 2 within said predetermined period of time, then the motor 39 is energised in the forward sense so as to cause the belts 28 to feed the card 2 back into the reader/writer 16 and then through the slot 40 (FIG. 2A) and into the retention bin 43. Once the endless belts 28 cause the card 2 to clear the shutter 20 the shutter 20 is moved to close the slot 18. Thereafter the motor 39 is once again stopped, the slot 18 is closed by the shutter 20, and the reader/writer 16 is again ready for the next operation.

Alternatively, if after data has been read from the card 2 the command from the host device 41 is to retain the card 2, then the card is immediately driven by the belts 28 through the slot 40 and into retention bin 43, at which time the motor 39 (FIG. 3) is stopped.

The reader/writer 16 in accordance with the present invention enables any of the ISO standard cards referred to above, including magnetic stripe cards, contact smart cards and contactless smart cards to be utilised by a host device 41 through a single reader/writer 16. The positioning of the magnetic stripe read head 32 between the input slot 18 and the smart card section 26 so that the magnetic stripe 4 on the card 2 is read as it is forwarded to the smart card section 26 enables the overall size of the reader/writer 16 to be reduced resulting in a compact reader/writer 16. This is because reading of the trailing portion of the magnetic stripe 4 takes place after a leading portion of the card 2 has entered the smart card section 26, thereby enabling the length of the magnetic head section 24 to be less than the length of the card 2. In addition, the positioning of the capacitive terminals 38 between the two pairs of inductive terminals 36 also assists in achieving a compact form of construction for the reader/writer 16.

The aforementioned embodiment is described by way of example only and features of the reader/writer 16 may be replaced by equivalents or alternatives where appropriate. For example, the pre-magnetic head 22 may be replaced by a card size detector which determines if the dimensions of a card 2 whose leading edge is inserted through the slot 18 conforms to one or more of the ISO standards referred to above. If the card 2 does comply with one of these standards the control means 35 will be activated to open the shutter 20 as with a card 2 containing a magnetic stripe 4. If the card 2 does not comply with one of these standards the control means 35 will not instruct the shutter actuator 37 to retract the shutter 20 and the slot 18 will remain closed. If a card size detector is used the smart cards with no magnetic stripe 4 can be supported.

Although the presently preferred embodiment of the invention has been described, it will be understood that various changes may be made within the scope of the appended claims.

What is claimed is:

1. A card reader (16) comprising:

an entry slot (18) for cards (2);

a smart card reading section (26) including a plurality of smart card reading means (34,38,36) for reading multiple types of ISO standard smart cards, said multiple types of ISO standard smart cards including contact smart cards, capacitive contactless smart cards and inductive contactless smart cards;

transport means (28) for moving a card (2) inserted through said entry slot (18) along a path through said reader (16) and for positioning said card (2) in said smart card reading section (26); and electronic control means (35) for:
activating said plurality of smart card reading means (34,38,36) in sequence while said card (2) is positioned in said smart card reading section (26),
determining which type of ISO standard smart card has been inserted into said reader if said card is an ISO standard smart card (16), and
implementing an appropriate communications protocol to read data from said card (2) if it is determined that said card (2) is an ISO standard smart card.

2. The card reader according to claim 1, further comprising:

a magnetic stripe read head (32) located along said path through said reader (16); and wherein said transport means (28) moves a card (2) inserted through said entry slot (18) past said magnetic stripe read head (32), enabling data to be read from said card (2) if said card (2) is a magnetic stripe card.

3. The card reader (16) according to claim 2, wherein:

said magnetic stripe read head (32) is located between said entry slot (18) and said smart card section (26).

4. The card reader (16) according to claim 1, further comprising:

a shutter (20) positioned adjacent the entry slot, said shutter being movable between a first position preventing access by said card, and a second permitting access by said card (2) to the interior of said card reader (16);

said shutter being under the control of said electronic control means (35), and by a magnetic read head (22) which is positioned adjacent the entry slot (18), said magnetic read head generating a signal which is transmitted to said control means (35) upon detection of a magnetic stripe (4) carried by said card (2), said control means causing said shutter to retract (20) in response to said signal.

5. The card reader (16) according to claim 2, further comprising:

a shutter (20) positioned adjacent the entry slot, said shutter being movable between a first position preventing access by said card, and a second permitting access by said card (2) to the interior of said card reader (16);

said shutter being under the control of said electronic control means (35), and by a magnetic read head (22) which is positioned adjacent the entry slot (18), said magnetic read head generating a signal which is transmitted to said control means (35) upon detection of a magnetic stripe (4) carried by said card (2), said control means causing said shutter to retract (20) in response to said signal.

6. The card reader (16) according to claim 1, further comprising:

means located along said path through said reader (16) for writing data to said card (2).

7. The card reader (16) according to claim 2, further comprising:

means located along said path through said reader (16) for writing data to said card (2).

8. The card reader (16) according to claim 1, wherein:

said smart card reading means for reading capacitive contactless smart cards comprises a line of terminals (38) located between two pairs of terminals (36) which are incorporated in said smart card reading means for reading inductive contactless smart cards.

9. The card reader (16) according to claim 2, wherein:

said smart card reading means for reading capacitive contactless smart cards comprises a line of terminals (38) located between two pairs of terminals (36) which are incorporated in said smart card reading means for reading inductive contactless smart cards.

10. A method of operating a card reader (16), comprising the steps of:

receiving a card (2) within said card reader (16);

conveying said card (2) past a magnetic stripe read head (32) so as to read any data stored on a magnetic stripe (4) on said card (2);

bringing said card (12) to rest adjacent a plurality of smart card reading means (34,38,36) for reading multiple types of ISO standard smart cards, said multiple types of ISO standard smart cards including contact smart cards, capacitive contactless smart cards and inductive contactless smart cards;

sequentially activating said plurality of smart card reading means (34,38,36) in sequence while said card (2) is positioned in said smart card reading section (26), determining which type of ISO standard smart card has been inserted into said reader if said card is an ISO standard smart card (16), and implementing an appropriate communications protocol to read data from said card (2) if it is determined that said card (2) is an ISO standard smart card.

11. The method according to claim 10, further including the step of:

reading said magnetic stripe (4) prior to activating the smart card reading means (34,36,38) and holding the data read from said magnetic stripe (4) until said smart card reading means (34,36,38) have been activated to determine if said card (2) is a smart card.

12. The method according to claim 10, wherein said step of sequentially activating said plurality of smart card reading means comprises the steps of first activating said smart card reading means (34) for reading contact smart cards; and second, activating said smart card reading means (36,38) for reading contactless smart cards.

13. The method according to claim 11, wherein said step of sequentially activating said plurality of smart card reading means comprises the steps of first activating said smart card reading means (34) for reading contact smart cards; and second, activating said smart card reading means (36,38) for reading contactless smart cards.

14. The method according to claim 10, wherein said step of sequentially activating said plurality of smart card reading means comprises the steps of first activating said smart card reading means (34) for reading contact smart cards; second, activating said smart card reading means (38) for reading capacitive contactless smart cards; and third, activating said smart card reading means (36) for reading inductive contactless smart cards.

15. The method according to claim 11, wherein said step of sequentially activating said plurality of smart card reading means comprises the steps of first activating said smart card reading means (34) for reading contact smart cards; second, activating said smart card reading means (38) for reading capacitive contactless smart cards; and third, activating said smart card reading means (36) for reading inductive contactless smart cards.

* * * * *